United States Patent
Ng et al.

(10) Patent No.: US 12,464,478 B2
(45) Date of Patent: Nov. 4, 2025

(54) APPARATUS AND METHOD USING DIFFERENT OPTIMUM MAXIMUM POWER REDUCTION VALUES LINEARLY DEPENDENT ON DIFFERENT BANDWIDTH GROUPS

(71) Applicant: NOKIA TECHNOLOGIES OY, Espoo (FI)

(72) Inventors: Man Hung Ng, Swindon (GB); Vesa Kalervo Lehtinen, Tampere (FI); Petri Juhani Vasenkari, Turku (FI); Tuomo Mikael Säynäjäkangas, Oulu (FI); Jaakko Kalevi Koskelo, Riihimäki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/197,686

(22) Filed: May 2, 2025

(65) Prior Publication Data
US 2025/0274879 A1     Aug. 28, 2025

Related U.S. Application Data

(63) Continuation of application No. PCT/EP2023/061587, filed on May 3, 2023.

(60) Provisional application No. 63/422,480, filed on Nov. 4, 2022.

(51) Int. Cl.
*H04W 52/10*     (2009.01)
*H04W 52/36*     (2009.01)
*H04W 52/42*     (2009.01)
*H04W 72/0457*     (2023.01)

(52) U.S. Cl.
CPC ......... *H04W 52/367* (2013.01); *H04W 52/42* (2013.01); *H04W 72/0457* (2023.01)

(58) Field of Classification Search
CPC ..... H04W 36/20; H04W 52/10; H04W 52/00; H04W 40/08
See application file for complete search history.

(56) References Cited

U.S. PATENT DOCUMENTS

| | | |
|---|---|---|
| 2015/0049726 A1 | 2/2015 | Lim et al. |
| 2015/0304962 A1 | 10/2015 | Fabien et al. |
| 2020/0053665 A1 | 2/2020 | Frank |
| 2024/0298272 A1 | 9/2024 | Umeda et al. |

FOREIGN PATENT DOCUMENTS

| | | |
|---|---|---|
| CN | 112567824 A | 3/2021 |
| WO | WO 2012/177393 A1 | 12/2012 |

OTHER PUBLICATIONS

"3rd Generation Partnership Project; Technical Specification Group Radio Access Network; 5GS; User Equipment (UE) conformance specification; Part 1: Common test environment (Release 17)", 3GPP TS 38.508-1, V17.6.0, Sep. 2022, 1435 pages.

(Continued)

*Primary Examiner* — Tu X Nguyen
(74) *Attorney, Agent, or Firm* — ALSTON & BIRD LLP

(57) ABSTRACT

An apparatus including at least one processor; and at least one memory storing instructions that, when executed with the at least one processor, cause the apparatus to: determine a channel bandwidth; and based upon the determined channel bandwidth, determine a maximum power reduction for the channel bandwidth using a value of the channel bandwidth as a value in an equation.

9 Claims, 10 Drawing Sheets

(56) References Cited

OTHER PUBLICATIONS

"3rd Generation Partnership Project; Technical Specification Group Radio Access Network; NR; User Equipment (UE) conformance specification; Radio transmission and reception; Part 1: Range 1 Standalone; (Release 17)", 3GPP TS 38.521-1, V17.6.1, Oct. 2022, 1693 pages.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.7.0, Sep. 2022, 723 pages.

"DraftCR into 38.101-1: Addition o f PC1 operation for n71 and n85", 3GPP TSG-RAN WG4 Meeting #105, R4-2220463, Nokia, Nov. 14-18, 2022, 11 pages.

"Email discussion summary for [104-bis-e][111] LTE_NR_HPUE_FWVM", 3GPP TSG-RAN WG4 Meeting #104-bis-e, R4-2217767, Agenda: 5.2, Nokia, Oct. 10-19, 2022, 9 pages.

"Input on PC1 FWA back-off for edge allocations", 3GPP TSG-RAN WG4 Meeting # 104-e, R4-2214048, Agenda: 10.15.2, Skyworks Solutions, Inc, Aug. 15-26, 2022, 3 pages.

"New WID: High-power UE operation for fixed-wireless/vehicle-mounted use cases in LTE bands and NR bands", 3GPP TSG RAN meeting #96e, RP-221841, Agenda: 9.1.5, Nokia, Jun. 6-9, 2022, 4 pages.

"PC1 MPR with edge region", 3GPP TSG-RAN WG4 Meeting #104-bis-e, R4-2216044, Agenda: 5.15.2, Nokia, Sep. 30, 2022, 7 pages.

"Third Generation Partnership Project (3GPP) Meeting Report for TSG RAN WG4 Meeting: 104-3, Electronic Meeting", 3GPP TSG-RAN WG4 Meeting #104bis-e, R4-2215300, (Oct. 10-19, 2022), 720 pages.

"TP to TR 37.829: PC1 A-MPR and MPR for bands n71 and n85", 3GPP TSG-RAN WG4 Meeting # 104-e, R4-2214432, Agenda: 10.15.4, Nokia, Aug. 15-26, 2022, pp. 1-9.

"WF on PC1 MPR with edge region", 3GPP TSG-RAN WG4 Meeting #104-bis-e, R4-2217116, Agenda: 5.15, Nokia, Oct. 10-19, 2022, 1 page.

Extended European Search Report for European Application No. 23171201.9 dated Oct. 20, 2023, 12 pages.

International Search Report and Written Opinion for Patent Cooperation Treaty Application No. PCT/EP2023/061587 dated Aug. 18, 2023, 16 pages.

Mood et al., "Chapter X: Linear Models", in *Introduction to the Theory of Statistics*, 3rd Edition, McGraw-Hill, London, (Apr. 1, 1974), 22 pages.

Motorola Mobility, "Comments on MPR for Non-Contiguous Allocations", 3GPP TSG-RAN WG4 Meeting #59_AH, R4-113891, (Jun. 27-Jul. 1, 2011), 5 pages.

Motorola Mobility, "MPR Masks for Non-Contiguous Allocations", 3GPP TSG-RAN WG4 Meeting #60, R4-114628, (Aug. 22-26, 2011), 4 pages.

Nokia et al., "PC1 MPR With Edge Region", 3GPP TSG-RAN WG4 Meeting #105, R4-2218283, (Nov. 14-18, 2022), 4 pages.

Nokia, "Email Discussion Summary for [104-bis-e][111] LTE_NR_HPUE_FWVM", 3GPP TSG-RAN WG4 Meeting #104-bis-3, R4-2216949, (Oct. 10-19, 2022), 9 pages.

Notice of Allowance for Taiwanese Application No. 112118142 dated Oct. 25, 2024, 3 pages.

Search Report for Taiwanese Application No. 112118142 dated Jun. 12, 2024, 2 pages.

Decision to Grant for Japanese Application No. 2024-553839 dated Mar. 24, 2025, 4 pages.

Non-Final Rejection Mailed on Jul. 31, 2025 for U.S. Appl. No. 18/323,833, 33 page(s).

Table 6.2.2-5 Maximum power reduction (MPR) for power class 1

Table 6.5.2.2-1: General NR spectrum emission mask

| Initial Conditions | |
|---|---|
| Test Environment as specified in TS 38.508-1 [5] subclause 4.1 | Normal, TL/VL, TL/VH, TH/VL, TH/VH |
| Test Frequencies as specified in TS 38.508-1 [5] subclause 4.3.1 | Low range, High range |
| Test Channel Bandwidths as specified in TS 38.508-1 [5] subclause 4.3.1 | Lowest, Highest |
| Test SCS as specified in Table 5.3.5-1 | Lowest, Highest |

702

| Test Parameters for Channel Bandwidths | | | | |
|---|---|---|---|---|
| Test ID | Freq | Downlink Configuration | Uplink Configuration | |
| | | N/A for Maximum Power | Modulation (NOTE 2) | RB allocation (NOTE 1) |
| 1 | Default | | DFT-s-OFDM Pi/2 BPSK | Inner Full |
| 2 | Low | | DFT-s-OFDM Pi/2 BPSK | Edge_1RB_Left |
| 3 | High | | DFT-s-OFDM Pi/2 BPSK | Edge_1RB_Right |
| 4 | Default | | DFT-s-OFDM Pi/2 BPSK | Outer Full |
| 5 | Default | | DFT-s-OFDM QPSK | Inner Full |
| 6 | Low | | DFT-s-OFDM QPSK | Edge_1RB_Left |
| 7 | High | | DFT-s-OFDM QPSK | Edge_1RB_Right |
| 8 | Default | | DFT-s-OFDM QPSK | Outer Full |
| 9 | Default | | DFT-s-OFDM 16 QAM | Inner Full |
| 10 | Low | | DFT-s-OFDM 16 QAM | Edge_1RB_Left |
| 11 | High | | DFT-s-OFDM 16 QAM | Edge_1RB_Right |
| 12 | Default | | DFT-s-OFDM 16 QAM | Outer Full |
| 13 | Low | | DFT-s-OFDM 64 QAM | Edge_1RB_Left |
| 14 | High | | DFT-s-OFDM 64 QAM | Edge_1RB_Right |
| 15 | Default | | DFT-s-OFDM 64 QAM | Outer Full |
| 16 | Low | | DFT-s-OFDM 256 QAM | Edge_1RB_Left |
| 17 | High | | DFT-s-OFDM 256 QAM | Edge_1RB_Right |
| 18 | Default | | DFT-s-OFDM 256 QAM | Outer Full |
| 19 | Default | | CP-OFDM QPSK | Inner Full |
| 20 | Low | | CP-OFDM QPSK | Edge_1RB_Left |
| 21 | High | | CP-OFDM QPSK | Edge_1RB_Right |
| 22 | Default | | CP-OFDM QPSK | Outer Full |
| 23 | Default | | CP-OFDM 16 QAM | Inner Full |
| 24 | Low | | CP-OFDM 16 QAM | Edge_1RB_Left |
| 25 | High | | CP-OFDM 16 QAM | Edge_1RB_Right |
| 26 | Default | | CP-OFDM 16 QAM | Outer Full |
| 27 | Low | | CP-OFDM 64 QAM | Edge_1RB_Left |
| 28 | High | | CP-OFDM 64 QAM | Edge_1RB_Right |
| 29 | Default | | CP-OFDM 64 QAM | Outer Full |
| 30 | Low | | CP-OFDM 256 QAM | Edge_1RB_Left |
| 31 | High | | CP-OFDM 256 QAM | Edge_1RB_Right |
| 32 | Default | | CP-OFDM 256 QAM | Outer Full |
| 33[3] | Low | | DFT-s-OFDM Pi/2 BPSK w Pi/2 BPSK DMRS | Edge_1RB_Left |
| 34[3] | High | | DFT-s-OFDM Pi/2 BPSK w Pi/2 BPSK DMRS | Edge_1RB_Right |
| 35[3] | Default | | DFT-s-OFDM Pi/2 BPSK w Pi/2 BPSK DMRS | Outer Full |

NOTE 1: The specific configuration of each RB allocation is defined in Table 6.1-1.
NOTE 2: DFT-s-OFDM Pi/2 BPSK test applies only for Ues which supports Pi/2 BPSK in FR1.
NOTE 3: Applicable to UEs indicating support for UE capability *lowPAPR-DMRS-PUSCHwithPrecoding-r16*.

Table 6.2.2.4.1-2a: Test Configuration Table for power class 1 for Band n14 (contiguous allocation)

Fig. 7

Table 6.2.2-5 Maximum power reduction (MPR) for power class 1

| Modulation | | MPR (dB) | | |
|---|---|---|---|---|
| | | Edge RB allocations | Outer RB allocations | Inner RB allocations |
| DFT-s-OFDM | Pi/2 BPSK | ≤ 0.5[1] | ≤ 0.5 | 0 |
| | Pi/2 BPSK w Pi/2 BPSK DMRS | ≤ 0.5[1] | 0 | 0 |
| | QPSK | ≤ 1 | | 0 |
| | 16 QAM | ≤ 2 | | ≤ 1 |
| | 64 QAM | ≤ 2.5 | | |
| | 256 QAM | ≤ 4.5 | | |
| CP-OFDM | QPSK | ≤ 3 | | ≤ 1.5 |
| | 16 QAM | ≤ 3 | | ≤ 2 |
| | 64 QAM | ≤ 3.5 | | |
| | 256 QAM | ≤ 6.5 | | |
| NOTE 1: Applicable for n14 | | | | |

Fig. 8

| Test ID | $P_{PowerClass}$ (dBm) | $\Delta P_{PowerClass}$ (dB) | MPR (dB) <50 MHz CBW | MPR (dB) ≥50 MHz CBW | $\Delta T_{C,c}$ (dB) | $P_{CMAX\_L,f,c}$ (dBm) <50 MHz CBW | $P_{CMAX\_L,f,c}$ (dBm) ≥50 MHz CBW | $T(P_{CMAX\_L,f,c})$ (dB) | $T_{L,c}$ (dB) | Upper limit (dBm) | Lower limit (dBm) <50 MHz CBW | Lower limit (dBm) ≥50 MHz CBW |
|---|---|---|---|---|---|---|---|---|---|---|---|---|
| 1 | 31 | 0 | 0 | 0 | 0 | 31.0 | 31.0 | 2.0 | 3 | 33.0 + TT | 28.0 — TT | 28.0 — TT |
| 2 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 3 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 4 | 31 | 0 | 0.5 | 0.5 | 0 | 30.5 | 30.5 | 2.0 | 3 | 33.0 + TT | 27.5 — TT | 27.5 — TT |
| 5 | 31 | 0 | 0 | 0 | 0 | 31.0 | 31.0 | 2.0 | 3 | 33.0 + TT | 28.0 — TT | 28.0 — TT |
| 6 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 7 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 8 | 31 | 0 | 1 | 1 | 0 | 30.0 | 30.0 | 2.0 | 3 | 33.0 + TT | 27.0 — TT | 27.0 — TT |
| 9 | 31 | 0 | 1 | 1 | 0 | 30.0 | 30.0 | 2.0 | 3 | 33.0 + TT | 27.0 — TT | 27.0 — TT |
| 10 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 11 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 12 | 31 | 0 | 2 | 2 | 0 | 29.0 | 29.0 | 2.0 | 3 | 33.0 + TT | 26.0 — TT | 26.0 — TT |
| 13 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 14 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 15 | 31 | 0 | 2.5 | 2.5 | 0 | 28.5 | 28.5 | 2.0 | 3 | 33.0 + TT | 25.5 — TT | 25.5 — TT |
| 16 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 17 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 18 | 31 | 0 | 4.5 | 4.5 | 0 | 26.5 | 26.5 | 2.0 | 3 | 33.0 + TT | 23.5 — TT | 23.5 — TT |
| 19 | 31 | 0 | 1.5 | 1.5 | 0 | 29.5 | 29.5 | 2.0 | 3 | 33.0 + TT | 26.5 — TT | 26.5 — TT |
| 20 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |

| Test ID | $P_{PowerClass}$ (dBm) | $\Delta P_{PowerClass}$ (dB) | MPR (dB) <50 MHz CBW | MPR (dB) ≥50 MHz CBW | $\Delta T_{C,c}$ (dB) | $P_{CMAX\_L,f,c}$ (dBm) <50 MHz CBW | $P_{CMAX\_L,f,c}$ (dBm) ≥50 MHz CBW | $T(P_{CMAX\_L,f,c})$ (dB) | $T_{L,c}$ (dB) | Upper limit (dBm) | Lower limit (dBm) <50 MHz CBW | Lower limit (dBm) ≥50 MHz CBW |
|---|---|---|---|---|---|---|---|---|---|---|---|---|
| 21 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 22 | 31 | 0 | 3 | 3 | 0 | 28.0 | 28.0 | 2.0 | 3 | 33.0 + TT | 25.0 — TT | 25.0 — TT |
| 23 | 31 | 0 | 2 | 2 | 0 | 29.0 | 29.0 | 2.0 | 3 | 33.0 + TT | 26.0 — TT | 26.0 — TT |
| 24 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 25 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 26 | 31 | 0 | 3 | 3 | 0 | 28.0 | 28.0 | 2.0 | 3 | 33.0 + TT | 25.0 — TT | 25.0 — TT |
| 27 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 28 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 29 | 31 | 0 | 3.5 | 3.5 | 0 | 27.5 | 27.5 | 2.0 | 3 | 33.0 + TT | 24.5 — TT | 24.5 — TT |
| 30 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 31 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 32 | 31 | 0 | 6.5 | 6.5 | 0 | 24.5 | 24.5 | 2.0 | 3 | 33.0 + TT | 21.5 — TT | 21.5 — TT |
| 33 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 34 | 31 | 0 | 7.2-6×CBW/100 | 5.35+3.15×CBW/100 | 0 | 24.1-26.5 | 24.1-22.5 | 2.0 | 3 | 33.0 + TT | (21.1 - TT)-(23.5 - TT) | (21.1 - TT)-(19.5 - TT) |
| 35 | 31 | 0 | 0 | 0 | 0 | 31.0 | 31.0 | 2.0 | 3 | 33.0 + TT | 28.0 — TT | 28.0 — TT |

NOTE 1: $P_{PowerClass}$ is the maximum UE power specified without taking into account the tolerance.
NOTE 2: TT for each frequency and channel bandwidth is specified in Table 6.2.5-5.

Fig. 9B

APPARATUS AND METHOD USING DIFFERENT OPTIMUM MAXIMUM POWER REDUCTION VALUES LINEARLY DEPENDENT ON DIFFERENT BANDWIDTH GROUPS

RELATED APPLICATION

This application is a continuation of International Application No. PCT/EP2023/061587, filed May 3, 2023, which claims priority to and the benefit of U.S. Provisional Application No. 63/422,480, filed Nov. 4, 2022, which are hereby incorporated by reference in their entirety.

TECHNICAL FIELD

The example and non-limiting embodiments relate generally to wireless communication and, more particularly, to power reduction during wireless transmission.

BACKGROUND

It is known to reduce the maximum output power of a user equipment due to higher order modulations and transmit bandwidth configurations.

SUMMARY

The following summary is merely intended to be an example. The summary is not intended to limit the scope of the claims.

In accordance with one aspect, an example apparatus is provided comprising: at least one processor; and at least one memory storing instructions that, when executed with the at least one processor, cause the apparatus to: determine a channel bandwidth; and based upon the determined channel bandwidth, determine a maximum power reduction for the channel bandwidth using a value of the channel bandwidth as a value in an equation.

In accordance with another aspect, an example method may be provided comprising: determine a channel bandwidth; and based upon the determined channel bandwidth, determine a maximum power reduction for the channel bandwidth using a value of the channel bandwidth as a value in an equation.

In accordance with another aspect, an example embodiment may be provided with a non-transitory computer readable medium comprising program instructions that, when executed with an apparatus, cause the apparatus to perform at least the following: determining which channel bandwidth group, from at least two channel bandwidth groups, the channel bandwidth is associated with; and selecting an equation, from a plurality of equations, based upon the determined channel bandwidth group.

In accordance with another aspect, an example apparatus may be provided comprising: means for determining which channel bandwidth group, from at least two channel bandwidth groups, the channel bandwidth is associated with; and means for selecting an equation, from a plurality of equations, based upon the determined channel bandwidth group.

In accordance with another aspect, an example apparatus may be provided comprising: at least one processor; and at least one memory storing instructions that, when executed with the at least one processor, cause the apparatus to perform: a first testing of performance of the apparatus with a first channel bandwidth within a first channel bandwidth group to test an allowed maximum power reduction, where the first channel bandwidth is the highest channel bandwidth supported by the apparatus within the first channel bandwidth group supported by the apparatus.

In accordance with another aspect, an example method may be provided comprising: a first testing of performance of an apparatus with a first channel bandwidth within a first channel bandwidth group to test an allowed maximum power reduction, where the first channel bandwidth is the highest channel bandwidth supported by the apparatus within the first channel bandwidth group supported by the apparatus.

In accordance with another aspect, an example embodiment may be provided with a non-transitory computer readable medium comprising program instructions that, when executed with an apparatus, cause the apparatus to perform at least the following: a first testing of performance of an apparatus with a first channel bandwidth within a first channel bandwidth group to test an allowed maximum power reduction, where the first channel bandwidth is the highest channel bandwidth supported by the apparatus within the first channel bandwidth group supported by the apparatus.

In accordance with another aspect, an example apparatus may be provided comprising: means for performing a first testing of performance of an apparatus with a first channel bandwidth within a first channel bandwidth group to test an allowed maximum power reduction, where the first channel bandwidth is the highest channel bandwidth supported by the apparatus within the first channel bandwidth group supported by the apparatus.

According to some aspects, there is provided the subject matter of the independent claims. Some further aspects are provided in subject matter of the dependent claims.

BRIEF DESCRIPTION OF THE DRAWINGS

The foregoing aspects and other features are explained in the following description, taken in connection with the accompanying drawings, wherein:

FIG. 7 is a table illustrating an example of a Test Configuration Table for power class 1 for Band n14 (contiguous allocation) for a specification;

FIG. 8 is a table illustrating an example of a maximum power reduction (MPR) for power class 1 for a specification;

FIGS. 9A-9b (collectively FIG. 9) is a table illustrating an example of a table regarding UE Power Class test requirements for band other than Band n14 for Power Class 1 (contiguous allocation) for a specification;

DETAILED DESCRIPTION

Figure 1:
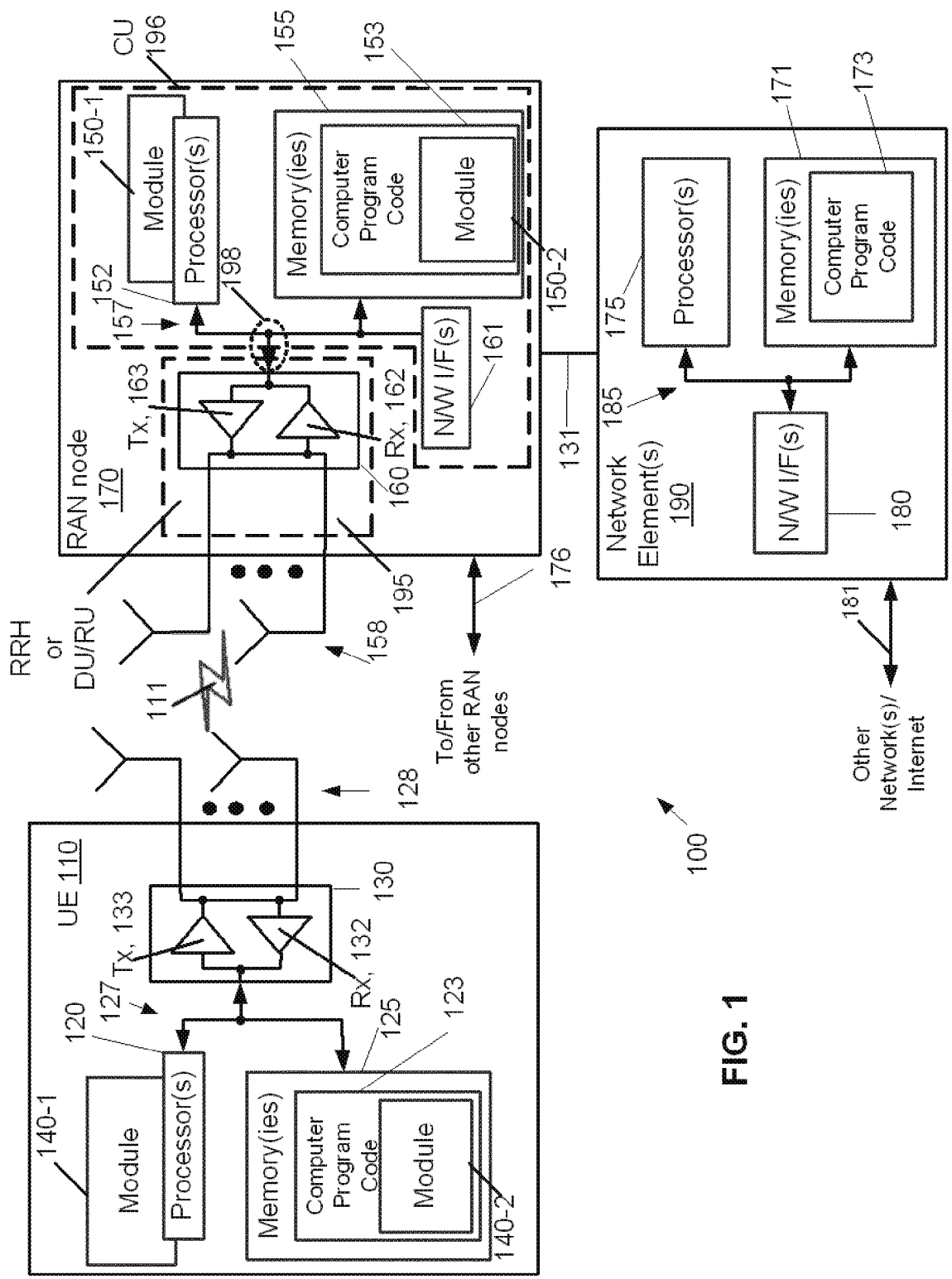
FIG. 1 is a block diagram of one possible and non-limiting exemplary system in which the exemplary embodiments may be practiced.

The following abbreviations that may be found in the specification and/or the drawing figures are defined as follows:
3GPP third generation partnership project
5G fifth generation
5GC 5G core network
AMF access and mobility management function
BB baseband
CU central unit
DL downlink
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD frequency division duplex
FR frequency range
gNB (or gNodeB) base station for 5G/NR, i.e., a node providing NR user plane and control plane protocol terminations towards the UE, and connected via the NG interface to the 5GC
I/F interface
LTE long term evolution
MAC medium access control
MME mobility management entity
MPR maximum power reduction
ng or NG new generation
ng-eNB or NG-eNB new generation eNB
NR new radio
N/W or NW network
PC power class
PDCP packet data convergence protocol
PHY physical layer
RAN radio access network
RB resource block
Rel release
RF radio frequency
RLC radio link control
RRH remote radio head
RRC radio resource control
RU radio unit
Rx receiver
SDAP service data adaptation protocol
SEM Spectrum emission mask
SGW serving gateway
SMF session management function
TDD time division duplex
TS technical specification
Tx transmitter
UE user equipment (e.g., a wireless, typically mobile device)
UL uplink
UPF user plane function
WI work item Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with PAN node 170 via a wireless link 111.

The RAN node 170 in this example is a base station that provides access by wireless devices such as the UE 110 to the wireless network 100. The PAN node 170 may be, for example, a base station for 5G, also called New Radio (NR). In 5G, the PAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-PAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the PAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function (s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The PAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, PAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

There is an ongoing 3GPP WI in RAN4 on High-power UE operation for fixed-wireless/vehicle-mounted use cases in LTE bands and NR bands. One of the discussed topics is the allowed maximum power reduction (MPR) for UE PC 1 when UL RB allocations are at or close to the UL channel bandwidth edges.

Figure 2:
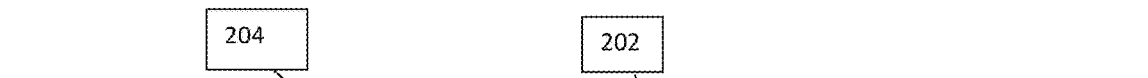
FIG. 2 is a table illustrating an example of maximum power reduction (MPR) for power class 1 for a specification.

Conventionally, a UE is allowed to reduce its maximum output power due to higher order modulations and transmit bandwidth configurations. For UE PC 1, the allowed MPR is defined in Table 6.2.2-5 of TS 38.101-1, as illustrated in FIG. 2, where the MPR for Edge RB allocations related to features as described herein are highlighted at 202 and 204. Edge RB allocations are defined as RB allocations that are located at (or close to) either channel edge, with allocation size not exceeding a specified maximum value. Currently UE PC1 is only defined for band n14 in NR for public safety operation (such as may be seen in Table 6.2.1-1 of TS 38.101-1), and the ongoing 3GPP WI is targeted to define UE PC 1 for other NR bands.

It has been discussed in R4-2214048 and shown by simulation results in R4-2216044 that it is problematic to apply the Edge RB allocations and MPR in Table 6.2.2-5 of TS 38.101-1 for UE PC 1 for other NR bands. Consequently, it was agreed at RAN4 #104-e in R4-2214432 that:

If PC 1 MPR needs to be representative of implementations using BB and RF transceivers from smartphone platforms, it should consider the addition of an edge allocation type with a minimum MPR of 8.5 dB and an edge region of seven RBs.

It may be feasible to agree a slightly better value of 8 dB or add signaling for the UE to declare the need for this additional allocation type.

Furthermore, it was agreed at RAN4 #104-bis-e in R4-2217116 that:

Specify a set of Edge RB allocations to allow higher MPR for RB allocations limited by SEM due to linear spectral regrowth from the windowing effect, except for band n14 MPR which is keep as it is.

Further discuss in next meeting if and how to make the PC1 MPR of Edge RB allocations depend on the channel bandwidth, with a maximum MPR of 8.5 dB.

Further discuss in next meeting if and how to define the set of Edge RB allocations in a way that depends on the channel bandwidth.

Therefore, a definition of Edge RB allocations and allowed MPR values for UE PC1 for other NR bands is still needed.

Figure 3:
FIG. 3 is a table illustrating an example of General NR spectrum emission mask for a specification.

For the allowed MPR, it has been proposed during email discussion at RAN4 #104-bis-e (ref. R4-2217767) that: "may be there should be only <50 MHz (most FDD) and >50 MHz (a few TDD)". This proposal was based on the fact that different General NR spectrum emission mask limits are defined for <50 MHz and >50 MHz channel bandwidth in Table 6.5.2.2-1 of TS 38.101-1 which is illustrated in annotated FIG. 3 where different limits are highlighted at 302 and 304, and hence two sets of Edge RB allocation and corresponding allowed MPR value are proposed to be defined, one set for less than 50 MHz (<50 MHz) channel bandwidth and one set for greater than or equal to 50 MHz (≥50 MHz) channel bandwidth.

Features as described herein may be used in regard to definition of Edge RB allocations and allowed MPR values for UE PC 1 for NR bands other than n14.

Figure 4:
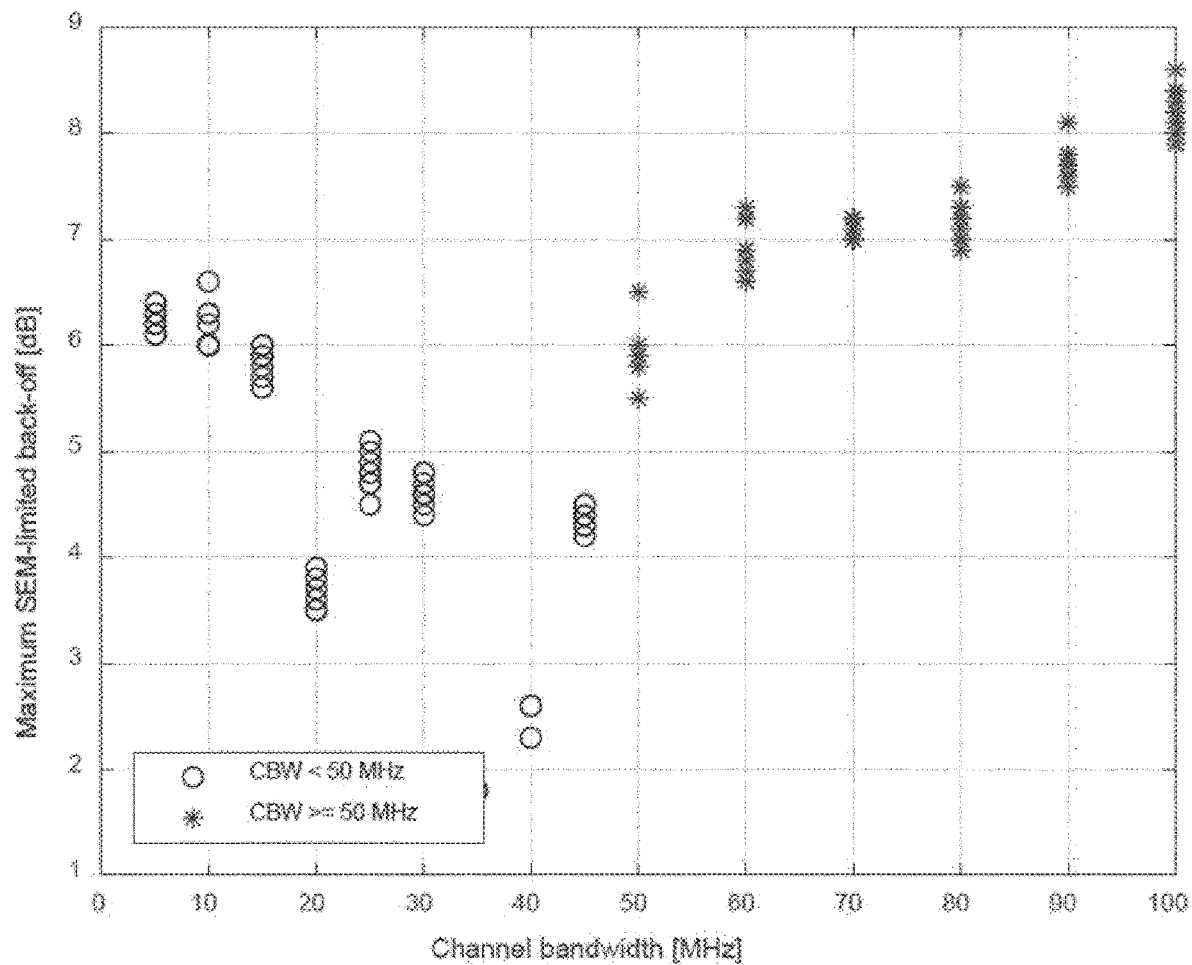
FIG. 4 is a chart illustrating example test samples of maximum SEM-limited back-off in decibels relative to channel bandwidth in MHz.

Referring also to FIG. 4, it has been shown that the required power back-off to meet the General NR spectrum emission mask limits vary with the channel bandwidth. For example, higher power back-off is required for ≥50 MHz channel bandwidth than <50 MHz channel bandwidth. This is due, as seen with reference to FIG. 3, to the more stringent −24 dBm limit 308 compared to the −13 dBm limit 306 in the 0-1 MHz outside the channel bandwidth as defined in Table 6.5.2.2-1 of TS 38.101-1. FIG. 4 shows SEM-limited back-off values as a function of channel bandwidth.

If a proposal was adopted where only one allowed MPR value is defined for the <50 MHz channel bandwidth group and only one allowed MPR value is defined for the ≥50 MHz channel bandwidth group, then the allowed MPR should be 6.5 dB and 8.5 dB for <50 MHz and ≥50 MHz channel bandwidth groups, respectively, to cover all channel bandwidths within the corresponding (<50 MHz and ≥50 MHz) group.

However, it can be seen in FIG. 4 that the required power back-off to meet the General NR spectrum emission mask limits also vary with the channel bandwidth inside each (<50 MHz and ≥50 MHz) group. The middle channel bandwidth requires lower power back-off than the lower channel bandwidth within the <50 MHz group. The middle channel bandwidth requires lower power back-off than higher channel bandwidth within the ≥50 MHz group. For example, 45 MHz channel bandwidth requires 2 dB less power back-off than 5 MHz channel bandwidth, and 50 MHz channel bandwidth requires 2 dB less power back-off than 100 MHz channel bandwidth. This is explained by the guard-to-SCS ratio (ratio of minimum guard band width to the subcarrier spacing). Below the 50 MHz channel bandwidth, this guard-to-SCS ratio mainly increases with the channel bandwidth. Whereas above 50 MHz the guard-to-SCS ratio decreases with increasing channel bandwidth. The width of the linear spectral regrowth, due to windowing, is proportional to the subcarrier spacing (SCS). Hence, a greater guard-to-SCS ratio results in lower required MPR. The minimum guard band width for each combination of channel bandwidth and SCS is defined in Table 5.3.3-1 of TS 38.101-1. Therefore, adopting a proposal to define the allowed MPR values with a common value for all channel bandwidth in the <50 group and a common value for all channel bandwidth in the ≥50 group will result in a 2 dB power back-off more than necessary which, in turn, would lead to 2 dB UL coverage loss.

Figure 5:
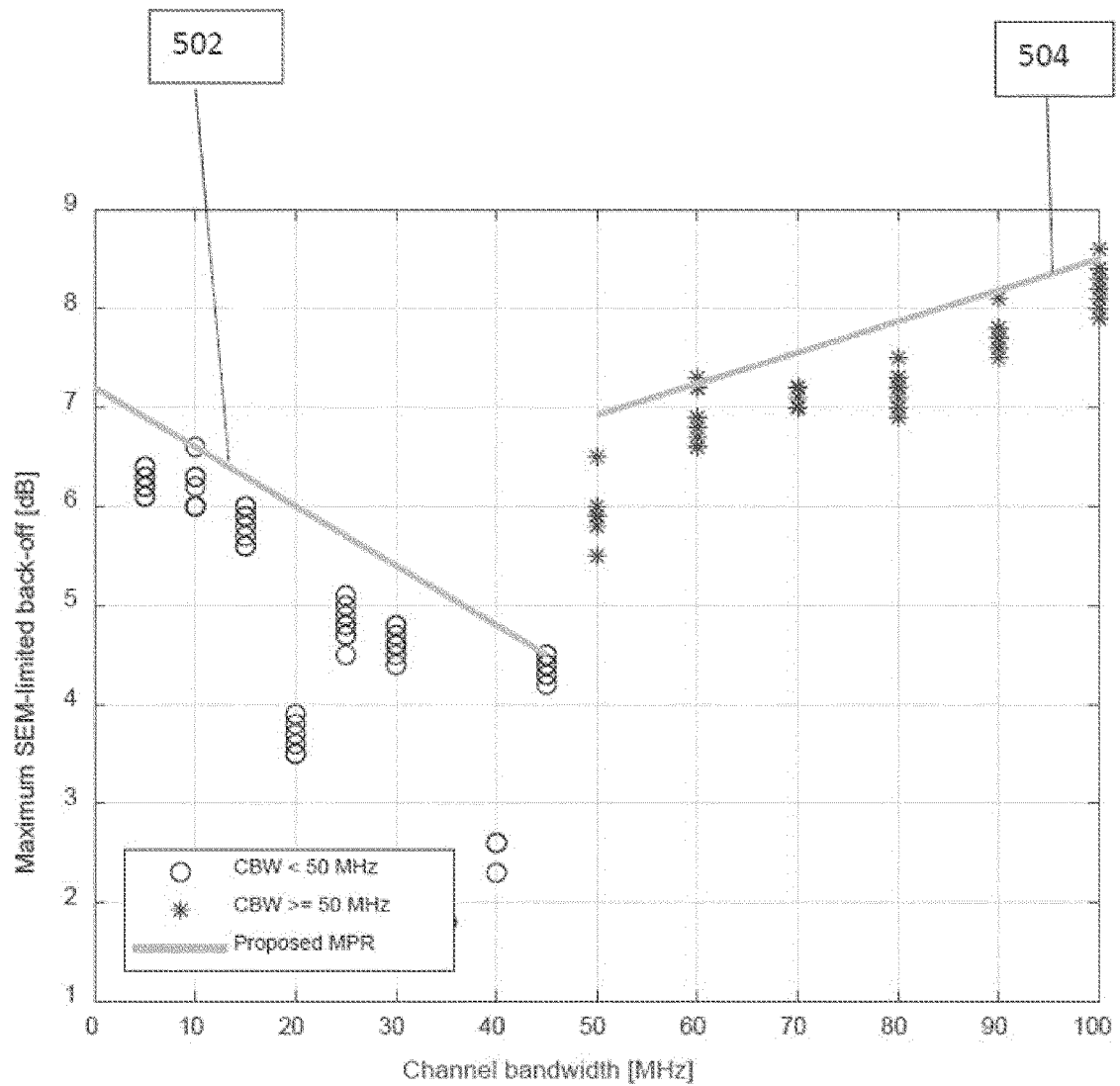
FIG. 5 is a chart similar to FIG. 4 but including reference lines to illustrate one aspect of how MPR may be defined as a function of channel bandwidth.

Referring also to FIG. 5, the "O"s represent multiple samples taken at <50 MHz at each of 5 MHz, 10 MHz, 15 MHz, 20 MHz, 25 MHz, 30 MHz, 40 MHz and 45 MHz. The "*"s represent multiple samples taken at ≥50 MHz at each of 50 MHz, 60 MHz, 70 MHz, 80 MHz, 90 MHz and 100 MHz. It can be seen that regression lines 502, 504 may be drawn in regard to each (<50 MHz and ≥50 MHz) group, where the required power back-off changes or varies as a function of the channel bandwidth. The power back-off may decrease linearly for the <50 MHz group as shown by line 502. For example, the power back-off may decrease at a channel bandwidth of 45 versus the channel bandwidth of 10. The power back-off may increase linearly for the ≥50 MHz group as shown by line 504. For example, the power back-off may increase at a channel bandwidth of 90 versus the channel bandwidth of 60. Therefore, to avoid allowing MPR that is more than necessary, it is proposed in one example that the channel bandwidths may be separated into channel bandwidth groups (such as the two groups <50 MHz and ≥50 MHz), and the allowed MPR values within each channel bandwidth group may be defined with an equation. Thus, there may be a different equation for each group. The following is an example of two equations; one for each of the two example groups noted above.

1. Within the first group (the <50 MHz channel bandwidth group):

$$MPR = 7.2 \text{ dB} - 6 \text{ dB} \cdot \frac{CBW}{100 \text{ MHz}}$$

2. Within the second group (the ≥50 MHz channel bandwidth group):

$$MPR = 5.35 \text{ dB} + 3.15 \text{ dB} \cdot \frac{CBW}{100 \text{ MHz}}$$

In the above equations CBW is the channel bandwidth, such as 10 MHz, 20 MHz, 30 MHz, etc. Note that the specific dB values (7.2, 6, 5.35, 3.15) in the equations are for example only, and other values may be used. With these type of equations the allowed MRP values may be defined as linear functions of the channel bandwidth. With the example equations noted above, the following are some sample results:
at CBW=10, the allowed MPR would be changed to be:
=7.2 dB−6 dB (10/100)
=7.2−0.6
=6.6 dB
at CBW=30, the allowed MPR would be changed to be:
=7.2 dB−6 dB (30/100)
=7.2−1.8
=5.4 dB
at CBW=60, the allowed MPR would be changed to be:
=5.35 dB+3.15 dB (60/100)
=5.35+1.89
=7.24 dB
at CBW=100, the allowed MPR would be changed to be:
=5.35 dB+3.15 dB (100/100)
=5.35+3.15
=8.5 dB Again, these are merely examples and should not be considered as limiting. The line 502 may be determined by comparing the highest values for the samples (corresponding to different waveforms and modulations) of each CBW and selecting two of the CBW where the line 502 between those two CBWs is above the highest values of the other CBWs in the group. In the example shown in FIG. 5, the two selected CBWs are 10 MHz and 45 MHz. The slope of the line 502 may then be determined. That slope is then used to determine the "7.2" and "6" values in the sample noted above. So, stated another way, the first equation is:

$$MPR = A \text{ dB} - B \text{ dB} \cdot \frac{CBW}{100 \text{ MHz}} \text{ for} < 50$$

where A and B are determined based upon a selected point and the slope of the line 502, and
the second equation is:

$$MPR = X \text{ dB} + Y \text{ dB} \cdot \frac{CBW}{100 \text{ MHz}} \text{ for} \geq 50$$

where X and Y are determined based upon a selected point and the slope of the other line 504.
For the first equation, this is a straight-line equation where A is a selected point on the line 502, and B is the slope. So, only B is determined based upon the slope, while A is determined based upon the highest point at 0 MHz CBW. For the second equation, this is also a straight-line equation where Y is the slope of the line 504, and X is determined based upon the highest point at 100 MHz CBW and the slope of the line (X is the value at 0 MHz CBW if the line 504 is extended to there).

Please note that these equations are merely examples. Any suitable equations would work so long as the correct equation is selected for the respective group, and that selected equation changes or varies the allowed MPR as a function of or based upon the CBW. In alternate examples, more or less than two groups could be provided. For example, <20 MHz could be in one group and another group could include ≥20 MHz through <50 MHz. In one type of alternate example, a group might only comprise one CBW, such as only 10 MHz for example. In one example a single equation is used with only one group. In another example a single equation is used for more than one group. So, two groups could use the same equation. In an alternate example, the line need not have a straight uniform slope; the line could be curved. In this alternate example, the equation may be based upon the curvature of the line relative to the CBWs.

Figure 6:
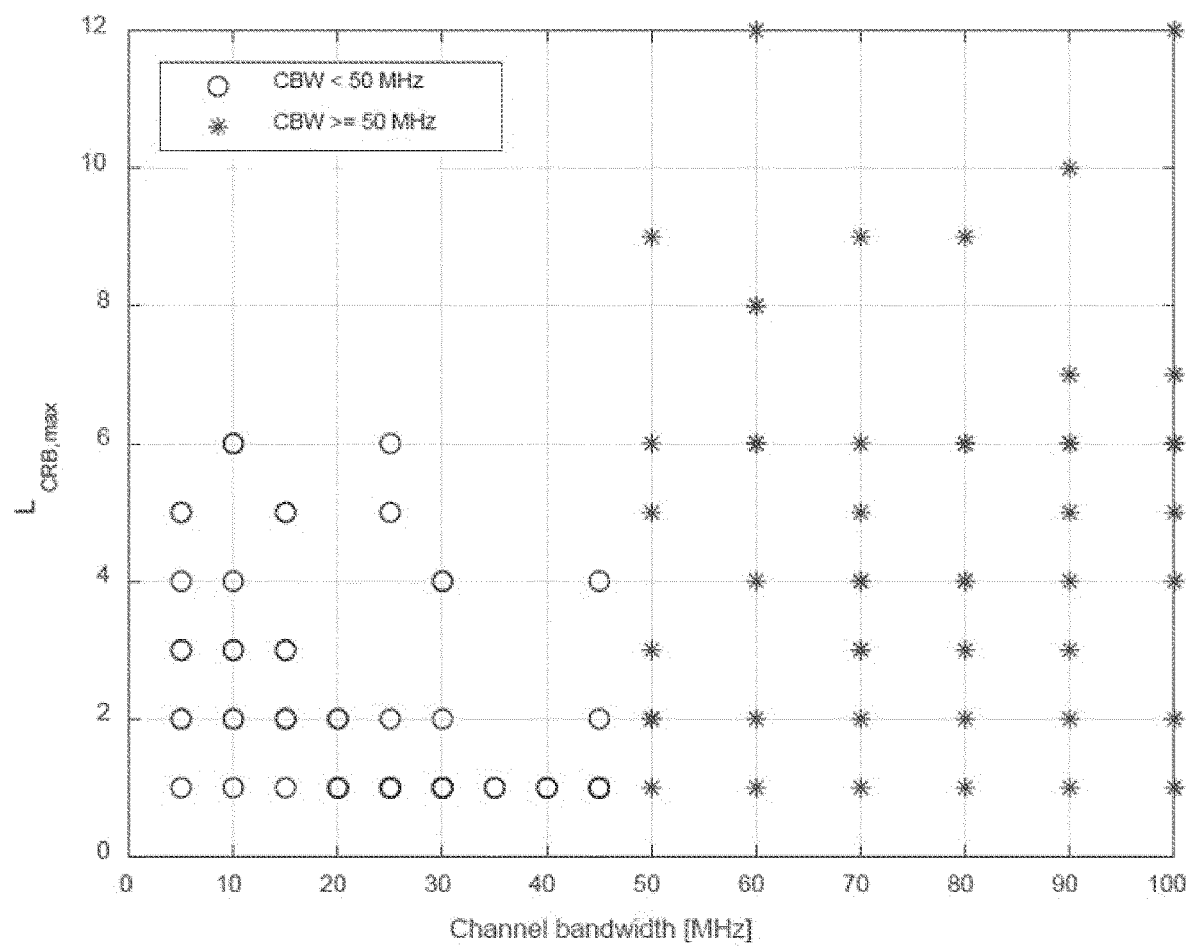
FIG. 6 is a chart illustrating example test samples for Maximum $L_{CRB}$ as function of channel bandwidth.

For the definition of Edge RB allocations, it has been shown as noted in R4-2216044 and as illustrated with FIG. 6 that the maximum Edge RB allocations requiring higher power back-off to meet the General NR spectrum emission mask limits also vary with the channel bandwidth, with larger Edge RB allocations required for ≥50 MHz channel bandwidth than <50 MHz channel bandwidth, again due to the more stringent −24 dBm (compared to −13 dBm) limit in the 0-1 MHz outside the channel bandwidth as defined in Table 6.5.2.2-1 of TS 38.101-1. Here there is no regression line as seen in the power back-off figure above. Therefore, the proposal discussed at RAN4 #104-bis-e to define two Edge RB allocation sizes (one for <50 MHz channel bandwidth and one for ≥50 MHz channel bandwidth) seems reasonable. Referring also to FIG. 7, for UE PC 1 for band n14 in NR, the allowed MPR may be tested with the lowest and highest channel bandwidths supported by the UE as required in Table 6.2.2.4.1-2a of TS 38.521-1, and the Test Channel Bandwidths 702 related to features as described herein. For UE PC 1 for other NR bands, to test the UE performance within each (<50 MHz and ≥50 MHz) channel bandwidth group, testing may comprise to test the allowed MPR also for the maximum channel bandwidth <50 MHz and the minimum channel bandwidth ≥50 MHz that are supported by the UE, in addition to the currently required lowest and highest channel bandwidths supported by the UE. This may help to ensure the UE can provide sufficient performance within all supported channel bandwidths within the two channel bandwidth groups.

So, testing may comprise both the 1. currently required lowest and highest bandwidths supported by the UE, in addition to 2. the new testing for the allowed MPR for the maximum channel bandwidth <50 MHz and the minimum channel bandwidth ≥50 MHz that are supported by the UE. Thus, two more test points Mid-Low for <50 MHz and Mid-High for ≥50 MHz may be provided. However, it should be noted that some operating bands only have <50 MHz channel bandwidth defined for them. So, the testing may be provided for only that one group.

Features as described herein may be implemented in TS 38.101-1 with the changes as noted below as an example. As noted in FIG. 8, a note may be added to Table 6.2.2-5 regarding applicable to n14, and include the following text at 6.2.2 UE maximum output power reduction:

Where the following parameters are defined to specify valid RB allocation ranges for Outer and Inner RB allocations:

$N_{RB}$ is the maximum number of RBs for a given Channel bandwidth and sub-carrier spacing defined in Table 5.3.2-1. $RB_{Start,Low}=\max(1, \text{floor}(L_{CRB}/2))$
where max( ) indicates the largest value of all arguments and floor(x) is the greatest integer less than or equal to x.

$$RB_{Start,High}=N_{RB}-RB_{Start,Low}-L_{CRB}$$

The RB allocation is an Inner RB allocation if the following conditions are met $$RB_{Start,Low} \leq RB_{Start} \leq RB_{Start,High}, \text{ and}$$

$$L_{CRB} \leq \text{ceil}(N_{RB}/2)$$

where ceil(x) is the smallest integer greater than or equal to x.

An Edge RB allocation is the one for which the RB(s) is (are) allocated at the lowermost or uppermost edge of the channel $L_{CRB} \leq 2$ RBs.

For PC1 UE supporting other bands than n14 the MPR for Edge RB allocation is defined as follows for two distinguished channel bandwidths groups as:
Within the <50 MHz channel bandwidth group:

$$MPR = CEIL\left(7.2 \text{ dB} - 6 \text{ dB} \cdot \frac{CBW}{100 \text{ MHz}}, 0.5 \text{ dB}\right)$$

Within the ≥50 MHz channel bandwidth group:

$$MPR = CEIL\left(5.35 \text{ dB} + 3.15 \text{ dB} \cdot \frac{CBW}{100 \text{ MHz}}, 0.5 \text{ dB}\right)$$

where CEIL(x,0.5 dB) means rounding x upwards to the closest multiple of 0.5 dB.

And for PC1 UE supporting other bands than n14 RB allocation is an Edge RB allocation if $$L_{CRB} \leq L_{CRB,edge} \text{ AND}(RB_{start} \leq RB_{start,edge} \text{ OR } RB_{start} \geq N_{RB}-RB_{start,edge}-L_{CRB}),$$

where $$L_{CRB,edge} = \begin{cases} 6, & CBW < 50 \text{ MHz} \\ 12, & CBW \geq 50 \text{ MHz} \end{cases}.$$

For CBW≥70 MHz with DFT-S-OFDM waveform and pi/2-BPSK, QPSK, or 16-QAM modulation, $RB_{start,edge}=1$. Otherwise, $RB_{start,edge}=0$.

The RB allocation is an Outer RB allocation for all other allocations which are not an Inner RB allocation or Edge RB allocation.

If CP-OFDM allocation satisfies following conditions, it is considered as almost contiguous allocation $$N_{RB\_gap}/(N_{RB\_alloc}+N_{RB\_gap}) \leq 0.25$$

and $N_{RB\_alloc}+N_{RB\_gap}$ is larger than 106, 51 or 24 RBs for 15 kHz, 30 kHz or 60 kHz SCS respectively where $N_{RB\_gap}$ is the total number of unallocated RBs between allocated RBs and $N_{RB\_alloc}$ is the total number of allocated RBs. The size and location of allocated and unallocated RBs are restricted by RBG parameters specified in clause 6.1.2.2 of TS 38.214 [10]. For these almost contiguous signals in power class 2 and 3, the allowed maximum power reduction defined in Table 6.2.2-2 and Table 6.2.2-1 are increased by $$CEIL\{10 \log_{10}(1+N_{RB\_gap}/N_{RB\_alloc}),0.5\}dB,$$

where CEIL{x,0.5}means x rounding upwards to closest 0.5 dB. The parameters of $RB_{Start,Low}$ and $RB_{Start,High}$ to specify valid RB allocation ranges for Outer and Inner RB allocations are defined as following:

$$RB_{Start,Low}=\max(1,\text{floor}((N_{RB\_alloc}+N_{RB\_gap})/2))$$

$$RB_{Start,High}=N_{RB}-RB_{Start,Low}-N_{RB\_alloc}-N_{RB\_gap}$$

For the UE maximum output power modified by MPR, the power limits specified in clause 6.2.4 apply.

Features may be implemented in TS 38.508-1 to include the following:

4.3.1 Test Frequencies

Editor's Note: n7 (Mid: 25 MHz, High: 50 MHz), n8 (High: 35 MHz), n25 (High: 45 MHz), n40 (High: 100 MHz), n65 (High: 50 MHz), n66 (High: 45 MHz), n71 (High: 35 MHz), n75(High: 50 MHz), n79 (Low: 10 MHz, RedCap: 20 MHz, 10 MHz) and n80 (High: 40 MHz) are currently not yet included in the test channel bandwidth tables due to test frequency have not been defined yet. and 4.3.1.0F Mid-Low Test Channel Bandwidth The mid-low test channel bandwidth definition for RF is given in Table 4.3.1.0F-1 for FR1.

TABLE 4.3.1.0F-1

Mid-Low Test Channel bandwidths for each NR band, FR1

| NR Band | UE Low Test Channel bandwidth [MHz][1, 1a, 1b] | RedCap UE Low Test Channel bandwidth [MHz] |
|---|---|---|
| n1 | 45 | 20 |
| n2 | 40 | 20 |
| n3 | 45 | 20 |
| n5 | 20[1], 25[2] | 20 |
| n7 | 20 | 20 |
| n8 | 20 | 20 |
| n12 | 15 | 15 |
| n14 | 10 | 10 |
| n20 | 20 | 20 |
| n24 | 10 | 10 |
| n25 | 40[1] | 20 |
| n26 | 20 | 20 |
| n28 | 30 | 20 |
| n29 | 10[2] | N/A |
| n30 | 10 | 10 |
| n34 | 15 | 15 |
| n38 | 25, 40[13] | 15 |
| n39 | 40 | 20 |
| n40 | 45 | 20 |
| n41 | 45 | 20 |
| n48 | 40[3], 45[4] | 20 |
| n50 | 45[1], 45[2] | 20 |
| n51 | 5 | 5 |
| n53 | 10 | 10 |
| n65 | 20 | 20 |
| n66 | 40 | 20 |
| n70 | 15[1], 25[2] | 15[1], 20[2] |
| n71 | 20[1] | 20 |
| n74 | 20 | 20 |
| n75 | 20[2] | N/A |
| n76 | 5[2] | N/A |
| n77 | 45 | 20 |
| n78 | 45 | 20 |
| n79 | 45 | N/A |
| n80 | 30[1] | [20] |
| n81 | 20[1] | [20] |
| n82 | 20[1] | [20] |
| n83 | 30[1] | [20] |

TABLE 4.3.1.0F-1-continued

Mid-Low Test Channel bandwidths for each NR band, FR1

| NR Band | UE Low Test Channel bandwidth [MHz][1, 1a, 1b] | RedCap UE Low Test Channel bandwidth [MHz] |
|---|---|---|
| n84 | 45[1] | [20] |
| n86 | 40[1] | [20] |
| n95 | 15[1] | [15] |
| n97 | 45[1] | [20] |
| n99 | 10[1] | [10] |

Note[1]:
Maximum values among all the possible <50 MHz channel BWcombinations per band in Table 5.3.5-1 of TS 38.521-1 [14] are listed. In case such bandwidth is not applicable for a given subcarrier spacing, the maximum bandwidth <50 MHz applicable for such subcarrier spacing shall be tested. In case such bandwidth is not defined in the UE release specification according to 38.101-1 [7] Table 5.3.5-1, the maximum bandwidth <50 MHz defined for that band in the UE release specification shall be tested.

Note[1a]:
Values listed in this table assume that the (non-optional) channel bandwidths specified in Table 5.3.5-1 of TS 38.101-1 [7] lower than the maximum are supported. However, these channel bandwidths are mandatory with capability parameter as defined in [55] TS 38.306 clause 4.2.1 for channelBWs-DL/channelBWs-UL parameters. Hence the UE might indicate them as not supported. In such case, select the closest channel bandwidth <50 MHz in both DL and UL.

Note[1b]:
For CA, DC, SDL and SUL, the low-test channel bandwidth per component carrier is chosen to allow minimum aggregated bandwidth defined for a given bandwidth combination set. In case no set of channel bandwidths per component carrier supported by the UE can achieve minimum aggregated bandwidth, select one combination of bandwidths per component carrier within the bandwidth combination set that minimizes the aggregated bandwidth.

Note[2]:
This UE channel bandwidth is applicable only to downlink.

Note[3]:
This UE channel bandwidth is applicable only to uplink.

Note[4]:
Applicable for use as SCell in CA or SCell in DC configuration.

Note[5]:
Applicable for use as single carrier, PCell in CA or PCell in DC configuration.

4.3.1.0G Mid-High Test Channel Bandwidth

The high test channel bandwidth definition for RF is given in Table 4.3.1.0G-1 for FR1.

TABLE 4.3.1.0G-1

MidHigh Test Channel bandwidths for each NR band, FR1

| NR Band | UE Mid-High Test Channel bandwidth [MHz][10, 11, 12] | RedCap UE Mid-High Test Channel bandwidth [MHz] |
|---|---|---|
| n1 | 50 | N/A |
| n2 | N/A | N/A |
| n3 | 50 | N/A |
| n5 | N/A | N/A |
| n7 | N/A | N/A |
| n8 | N/A | N/A |
| n12 | N/A | N/A |
| n14 | N/A | N/A |
| n20 | N/A | N/A |
| n24 | N/A | N/A |
| n25 | N/A | N/A |
| n26 | N/A | N/A |
| n28 | N/A | N/A |
| n29 | N/A | N/A |
| n30 | N/A | N/A |
| n34 | N/A | N/A |
| n38 | N/A | N/A |
| n39 | N/A | N/A |
| n40 | 50 | N/A |
| n41 | 50 | N/A |
| n48 | N/A[3], 50[4] | N/A |
| n50 | 50 | N/A |
| n51 | N/A | N/A |
| n53 | N/A | N/A |
| n65 | N/A | N/A |
| n66 | N/A | N/A |
| n70 | N/A | N/A |
| n71 | N/A | N/A |
| n74 | N/A | N/A |
| n75 | N/A | N/A |
| n76 | N/A | N/A |
| n77 | 50 | N/A |
| n78 | 50 | N/A |
| n79 | 50 | N/A |
| n80 | N/A | N/A |
| n81 | N/A | N/A |
| n82 | N/A | N/A |
| n83 | N/A | N/A |
| n84 | 50[1] | N/A |
| n86 | N/A | N/A |
| n95 | N/A | N/A |
| n97 | 50[1] | N/A |
| n99 | N/A | N/A |

Note[1]:
This UE channel bandwidth is applicable only to uplink.

Note[2]:
This UE channel bandwidth is applicable only to downlink.

Note[3]:
Applicable for use as single carrier, PCell in CA or PCell in DC configuration.

Note[4]:
Applicable for use as DL SCell in CA or DL SCell in DC configuration.

Note[5]:
Void

Note[6]:
Void

Note[7]:
Void

Note[8]:
Void

Note[9]:
Void

Note[10]:
Minimum values among all the possible ≥50 MHz channel BW combinations per band in Table 5.3.5-1 of TS 38.521-1 [14] are listed. In case such bandwidth is not applicable for a given subcarrier spacing, the minimum bandwidth ≥50 MHz applicable for such subcarrier spacing shall be tested. In case such bandwidth is not defined in the UE release specification according to 38.101-1 [7] Table 5.3.5-1, the minimum bandwidth ≥50 MHz defined for that band in the UE release specification shall be tested. In case such bandwidth is optional in the UE release specification according to 38.101-1 [7] Table 5.3.5-1 and not supported by the UE, the minimum non-optional bandwidth ≥50 MHz for the UE release specification shall be tested.

Note[11]:
Values listed in this table assume that the maximum (non-optional) channel bandwidth specified in Table 5.3.5-1 of TS 38.101-1 [7]is mandatory without capability parameter (i.e., purely mandatory) as defined in [55] TS 38.306 clause 4, 2, 1 for supportedBandwidthDL/supportedBandwidthUL parameters in a band combination with a single band entry and a single CC entry (i.e., non-CA band combination).

Note[12]:
For CA, DC, SDL and SUL, the High-test channel bandwidth per component carrier is chosen to allow maximum aggregated bandwidth defined for a given bandwidth combination set. In case no set of channel bandwidths per component carrier supported by the UE can achieve maximum aggregated bandwidths in CA, DC, SDL or SUL, some flexibility could be provided to the ecosystem for Rel-15 and Rel-16 so one combination of bandwidth per component carrier within the bandwidth combination set that maximizes the aggregated bandwidth is tested instead values described in Note 12 in Table 4.3.1.0C-1.

Note[13]:
These UE channel bandwidths are applicable to sidelink operation.

NOTE 1
(Informative): In case values listed in table above are higher than those signaled by the UE in supportedBandwidthDL/supportedBandwidthUL, some flexibility could be provided to the ecosystem for Rel-15 and Rel-16 so the value signaled by the UE in supportedBandwidthDL/supportedBandwidthUL is used in single carrier operation instead values described in Table 4.3.1.0C-1.

Features may be implemented in TS 38.521-1 to include the following:

6.2.2 UE Maximum Output Power Reduction 6.2.2.1 Test Purpose

The number of RB identified in Table 6.2.2.3-1 is based on meeting the requirements for adjacent channel leakage ratio and the maximum power reduction (MPR) due to Cubic Metric (CM).

6.2.2.2 Test Applicability

The requirements of this test apply to all types of NR Power Class 3 UE release 15 and forward and NR Power Class 1 UE release 15 and forward.

The requirements of this test apply to all types of NR Power Class 2 UE not supporting txDiversity-r16 release 15 and forward.

NOTE: Test execution is not necessary if TS 38.521-1 6.5.2.4.1 is executed.

6.2.2.3 Minimum Conformance Requirements

UE is allowed to reduce the maximum output power due to higher order modulations and transmit bandwidth configurations. For UE power class 2 and 3 and UE power class 1, the allowed maximum power reduction (MPR) is defined in Table 6.2.2.3-2, Table 6.2.2.3-1, Table 6.2.2.3-5 and Table 6.2.2.3-5a, respectively for channel bandwidths ≤100 MHz.

If the relative channel bandwidth ≤4% for TDD bands or ≤3% for FDD band, the ΔMPR is set to zero.

If the relative channel bandwidth is larger than 4% for TDD bands or 3% for FDD bands, the ΔMPR is defined in Table 6.2.2.3-3.

Where relative channel bandwidth=$2*BW_{Channel}/(F_{UL\_low}+F_{UL\_high})$.

The allowed MPR for SRS, PUCCH formats 0, 1, 3 and 4, and PRACH shall be as specified for QPSK modulated DFT-s-OFDM of equivalent RB allocation. The allowed MPR for PUCCH format 2 shall be as specified for QPSK modulated CP-OFDM of a equivalent RB allocation. and TABLE 6.2.2.3-5a Maximum power reduction (MPR) for power class 1 for bands other than Band n14

| | | MPR (dB) | | |
|---|---|---|---|---|
| Modulation | | Edge RB allocations | Outer RB allocations | Inner RB allocations |
| DFT-s-OFDM | Pi/2 BPSK | (NOTE 1) | ≤0.5 | 0 |
| | Pi/2 BPSK w Pi/2 BPSK DMRS | (NOTE 1) | 0 | 0 |
| | QPSK | (NOTE 1) | ≤1 | 0 |
| | 16 QAM | (NOTE 1) | ≤2 | ≤1 |
| | 64 QAM | (NOTE 1) | | ≤2.5 |
| | 256 QAM | (NOTE 1) | | ≤4.5 |
| CP-OFDM | QPSK | (NOTE 1) | ≤3 | ≤1.5 |
| | 16 QAM | (NOTE 1) | <3 | ≤2 |
| | 64 QAM | (NOTE 1) | | ≤3.5 |
| | 256 QAM | (NOTE 1) | | ≤6.5 |

NOTE 1:
MPR for all modulations for Edge RB allocation is defined as following for two distinguished channel bandwidths groups as:
Within the <50 MHz channel bandwidth group:

$$MPR = \text{CEIL}\left(7.2 \text{ dB} - 6 \text{ dB} \cdot \frac{CBW}{100 \text{ MHz}}, 0.5 \text{ dB}\right)$$

Within the ≥50 MHz channel bandwidth group:

$$MPR = \text{CEIL}\left(5.35 \text{ dB} + 3.15 \text{ dB} \cdot \frac{CBW}{100 \text{ MHz}}, 0.5 \text{ dB}\right)$$

Where the following parameters are defined to specify valid RB allocation ranges for Outer and Inner RB allocations:

$N_{RB}$ is the maximum number of RBs for a given Channel bandwidth and sub-carrier spacing defined in Table 5.3.2-1.

$$RB_{Start,Low}=\max(1,\text{floor}(L_{CRB}/2))$$

where max( ) indicates the largest value of all arguments and floor(x) is the greatest integer less than or equal to x.

$$RB_{Start,High}=N_{RB}-RB_{Start,Low}-L_{CRB}$$

The RB allocation is an Inner RB allocation if the following conditions are met:

$$RB_{Start,Low} \leq RB_{Start} \leq RB_{Start,High}, \text{ and}$$

$$L_{CRB} \leq \text{ceil}(N_{RB}/2)$$

where ceil(x) is the smallest integer greater than or equal to x.

An Edge RB allocation is the one for which the RB(s) is (are) allocated at the lowermost or uppermost edge of the channel with $L_{CRB} \leq 2$ RBs.

The RB allocation is an Outer RB allocation for all other allocations which are not an Inner RB allocation or Edge RB allocation.

If CP-OFDM allocation satisfies following conditions, it is considered as almost contiguous allocation $$N_{RB\_gap}/(N_{RB\_alloc}+N_{RB\_gap}) \leq 0.25$$

and $N_{RB\_alloc}+N_{RB\_gap}$ is larger than 106, 51 or 24 RBs for 15 kHz, 30 kHz or 60 kHz SCS respectively where $N_{RB\_gap}$ is the total number of unallocated RBs between allocated RBs and $N_{RB\_alloc}$ is the total number of allocated RBs. The size and location of allocated and unallocated RBs are restricted by RBG parameters specified in subclause 6.1.2.2 of TS 38.214 [12]. For these almost contiguous signals in power class 2 and 3, the allowed maximum power reduction defined in Table 6.2.2.3-2 and Table 6.2.2.3-1 are increased by $$\text{CEIL}\{10 \log_{10}(1+N_{RB\_gap}/N_{RB\_alloc}), 0.5\} \text{dB},$$

where CEIL{x,0.5} means x rounding upwards to closest 0.5 dB. The parameters of $RB_{Start,Low}$ and $RB_{Start,High}$ to specify valid RB allocation ranges for Outer and Inner RB allocations are defined as following:

$$RB_{Start,Low}=\max(1,\text{floor}((N_{RB\_alloc}+N_{RB\_gap})/2))$$

$$RB_{Start,High}=N_{RB}-RB_{Start,Low}-N_{RB\_alloc}-N_{RB\_gap}$$

For the UE maximum output power modified by MPR, the power limits specified in subclause 6.2.4 apply.

The normative reference for this requirement is TS 38.101-1 [2] clause 6.2.2.

6.2.2.4 Test Description

6.2.2.4.1 Initial Conditions

Initial conditions are a set of test configurations the UE needs to be tested in and the steps for the SS to take with the UE to reach the correct measurement state.

The initial test configurations consist of environmental conditions, test frequencies, channel bandwidths and sub-carrier spacing based on NR operating bands specified in table 5.3.5-1. All of these configurations shall be tested with applicable test parameters for each combination of test channel bandwidth and sub-carrier spacing, and are shown in Table 6.2.2.4.1-1, Table 6.2.2.4.1-2, Table 6.2.2.4.1-2a, Table 6.2.2.4.1-2c and Table 6.2.2.4.1-3. The details of the uplink reference measurement channels (RMCs) are specified in Annexes A.2. Configurations of PDSCH and PDCCH before measurement are specified in Annex C.2.

and

TABLE 6.2.2.4.1-2c

Test Configuration Table for power class 1 for bands other than Band n14 (contiguous allocation)

| Initial Conditions | |
| --- | --- |
| Test Environment as specified in TS 38.508-1 [5] subclause 4.1 | Normal, TL/VL, TL/VH, TH/VL, TH/VH |
| Test Frequencies as specified in TS 38.508-1 [5] subclause 4.3.1 | Low range, High range |
| Test Channel Bandwidths as specified in TS 38.508-1 [5] subclause 4.3.1 | Lowest, Mid-Low, Mid-High, Highest |
| Test SCS as specified in Table 5.3.5-1 | Lowest, Highest |

| Test Parameters for Channel Bandwidths | | | |
| --- | --- | --- | --- |
| | | Uplink Configuration | |
| Test ID | Freq | Downlink Configuration | Modulation (NOTE 2) | RB allocation (NOTE 1) |
| 1 | Default | N/A for Maximum Power | DFT-s-OFDM Pi/2 BPSK | Inner Full |
| 2 | Low | | DFT-s-OFDM Pi/2 BPSK | Edge_1RB_Left |
| 3 | High | | DFT-s-OFDM Pi/2 BPSK | Edge_1RB_Right |
| 4 | Default | | DFT-s-OFDM Pi/2 BPSK | Outer Full |
| 5 | Default | | DFT-s-OFDM QPSK | Inner Full |
| 6 | Low | | DFT-s-OFDM QPSK | Edge_1RB_Left |
| 7 | High | | DFT-s-OFDM QPSK | Edge_1RB_Right |
| 8 | Default | | DFT-s-OFDM QPSK | Outer Full |
| 9 | Default | | DFT-s-OFDM 16 QAM | Inner Full |
| 10 | Low | | DFT-s-OFDM 16 QAM | Edge_1RB_Left |
| 11 | High | | DFT-s-OFDM 16 QAM | Edge_1RB_Right |
| 12 | Default | | DFT-s-OFDM 16 QAM | Outer Full |
| 13 | Low | | DFT-s-OFDM 64 QAM | Edge_1RB_Left |
| 14 | High | | DFT-s-OFDM 64 QAM | Edge_1RB_Right |
| 15 | Default | | DFT-s-OFDM 64 QAM | Outer Full |
| 16 | Low | | DFT-s-OFDM 256 QAM | Edge_1RB_Left |
| 17 | High | | DFT-s-OFDM 256 QAM | Edge_1RB_Right |
| 18 | Default | | DFT-s-OFDM 256 QAM | Outer Full |
| 19 | Default | | CP-OFDM QPSK | Inner Full |
| 20 | Low | | CP-OFDM QPSK | Edge_1RB_Left |
| 21 | High | | CP-OFDM QPSK | Edge_1RB_Right |
| 22 | Default | | CP-OFDM QPSK | Outer Full |
| 23 | Default | | CP-OFDM 16 QAM | Inner Full |
| 24 | Low | | CP-OFDM 16 QAM | Edge_1RB_Left |
| 25 | High | | CP-OFDM 16 QAM | Edge_1RB_Right |
| 26 | Default | | CP-OFDM 16 QAM | Outer Full |
| 27 | Low | | CP-OFDM 64 QAM | Edge_1RB_Left |
| 28 | High | | CP-OFDM 64 QAM | Edge_1RB_Right |
| 29 | Default | | CP-OFDM 64 QAM | Outer Full |
| 30 | Low | | CP-OFDM 256 QAM | Edge_1RB_Left |
| 31 | High | | CP-OFDM 256 QAM | Edge_1RB_Right |
| 32 | Default | | CP-OFDM 256 QAM | Outer Full |
| 333 | Low | | DFT-s-OFDM Pi/2 BPSK w Pi/2 BPSK DMRS | Edge_1RB_Left |
| 343 | High | | DFT-s-OFDM Pi/2 BPSK w Pi/2 BPSK DMRS | Edge_1RB_Right |
| 353 | Default | | DFT-s-OFDM Pi/2 BPSK w Pi/2 BPSK DMRS | Outer Full |

NOTE 1:
The specific configuration of each RB allocation is defined in Table 6.1-1.
NOTE 2:
DFT-s-OFDM Pi/2 BPSK test applies only for UEs which supports Pi/2 BPSK in FR1.
NOTE 3:
Applicable to UEs indicating support for UE capability lowPAPR-DMRS-PUSCHwithPrecoding-r16.

and 6.2.2.4.2 Test Procedure

1. SS sends uplink scheduling information for each UL HARQ process via PDCCH DCI format 0_1 for C_RNTI to schedule the UL RMC according to Table 6.2.2.4.1-1, Table 6.2.2.4.1-2, Table 6.2.2.4.1-2a and Table 6.2.2.4.1-3. Since the UE has no payload and no loopback data to send the UE sends uplink MAC padding bits on the UL RMC.

2. Send continuously uplink power control "up" commands in every uplink scheduling information to the UE; allow at least 200 ms for the UE to reach $P_{UMAX}$ level.

3. Measure the mean power of the UE in the channel bandwidth of the radio access mode. The period of measurement shall be at least the continuous duration of 1 ms over consecutive active uplink slots. For TDD, only slots consisting of only UL symbols are under test.

4. For UEs supporting Power Class 1 and Power Class 2, repeat steps 1~3 for Test ID 22 and 36 in Table 6.2.2.4.1-1 on the applicable bands with message exception of P-Max defined in Table 6.2.2.4.3-2.

NOTE 1: When switching to DFT-s-OFDM waveform, as specified in the test configuration Table 6.2.2.4.1-1, Table 6.2.2.4.1-2, send an NR RRCReconfiguration message according to TS 38.508-1 [5] clause 4.6.3 Table 4.6.3-118 PUSCH-Config with TRANSFORM_PRECODER_ENABLED condition.
and 6.2.2.4.2 Test Procedure 1. SS sends uplink scheduling information for each UL HARQ process via PDCCH DCI format 0_1 for C_RNTI to schedule the UL RMC according to Table 6.2.2.4.1-1, Table 6.2.2.4.1-2, Table 6.2.2.4.1-2a and Table 6.2.2.4.1-3. Since the UE has no payload and no loopback data to send the UE sends uplink MAC padding bits on the UL RMC.

2. Send continuously uplink power control "up" commands in every uplink scheduling information to the UE; allow at least 200 ms for the UE to reach $P_{UMAX}$ level.

3. Measure the mean power of the UE in the channel bandwidth of the radio access mode. The period of measurement shall be at least the continuous duration of 1 ms over consecutive active uplink slots. For TDD, only slots consisting of only UL symbols are under test.

4. For UEs supporting Power Class 1 and Power Class 2, repeat steps 1-3 for Test ID 22 and 36 in Table 6.2.2.4.1-1 on the applicable bands with message exception of P-Max defined in Table 6.2.2.4.3-2.

NOTE 1: When switching to DFT-s-OFDM waveform, as specified in the test configuration Table 6.2.2.4.1-1, Table 6.2.2.4.1-2, send an NR RRCReconfiguration message according to TS 38.508-1 [5] clause 4.6.3 Table 4.6.3-118 PUSCH-Config with TRANSFORM_PRECODER_ENABLED condition.
and 6.2.2.5 Test Requirement The maximum output power, derived in step 3 shall be within the range prescribed by the nominal maximum output power and tolerance in Table 6.2.2.5-1 to Table 6.2.2.5-9a.

The maximum output power, derived in step 4 shall be within the range prescribed by the nominal maximum output power and tolerance in Table 6.2.2.5-1, Table 6.2.2.5-3 and 6.2.2.5.4.

and the new table for Table 6.2.2.5-4c: UE Power Class test requirements for band other than Band n14 for Power Class 1 (contiguous allocation) shown in FIG. 9.

With features as described herein, a 0.5 dB rounding for the equation(s) may be used in the specifications; considering it may be difficult to achieve smaller than 0.5 dB accuracy in the actual device test.

In accordance with one example embodiment, an example apparatus may be provided comprising: at least one processor; and at least one memory storing instructions that, when executed with the at least one processor, cause the apparatus to: determine a channel bandwidth; and based upon the determined channel bandwidth, determine a maximum power reduction for the channel bandwidth using a value of the channel bandwidth as a value in an equation.

A formula may comprise selecting an equation from a plurality of equations, and then using the selected equation to determine a MPR. The equation may be determined from at least two respective values of power backoff for channel bandwidths. The equation may comprise a line equation which is determined based upon at least two highest backoff values of at least two spaced respective channel bandwidths in a same channel bandwidth group. The equation may comprise the value of the channel bandwidth multiplied by a first power value to produce a product, where the product is subtracted from a second power value. The equation may comprise the value of the channel bandwidth multiplied by a first power value to produce a product, where the product is added to a second power value. The instructions may further cause: determining which channel bandwidth group, from at least two channel bandwidth groups, the channel bandwidth is associated with; and selecting the equation, from a plurality of equations, based upon the determined channel bandwidth group. A first one of the plurality of equations may be based upon a line equation with a negative slope and a second one of the plurality of equations is based upon a line equation with a positive slope. A first one of the groups may comprise channel bandwidths below 50 MHz. A second one of the groups may comprise channel bandwidths equal to or above 50 MHz.

Figure 10:
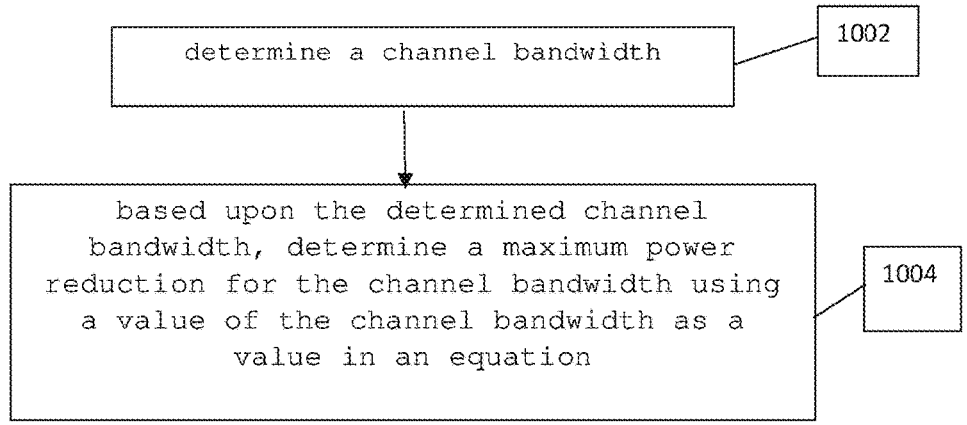
FIG. 10 is a diagram illustrating an example method for an example embodiment.

Referring also to FIG. 10, in accordance with another example embodiment, an example method may be provided comprising: determine a channel bandwidth as indicated with block 1002; and based upon the determined channel bandwidth, determine a maximum power reduction for the channel bandwidth using a value of the channel bandwidth as a value in an equation as indicated with block 1004.

A formula may comprise selecting an equation from a plurality of equations, and then using the selected equation to determine a MPR. The equation may be determined from at least two respective values of power backoff for channel bandwidths. The equation may comprise a line equation which is determined based upon at least two highest backoff values of at least two spaced respective channel bandwidths in a same channel bandwidth group. The equation may comprise the value of the channel bandwidth multiplied by a first power value to produce a product, where the product is subtracted from a second power value. The equation may comprise the value of the channel bandwidth multiplied by a first power value to produce a product, where the product is added to a second power value. The method may further comprise: determining which channel bandwidth group, from at least two channel bandwidth groups, the channel bandwidth is associated with; and selecting the equation, from a plurality of equations, based upon the determined channel bandwidth group. A first one of the plurality of equations may be based upon a line equation with a negative slope and a second one of the plurality of equations is based upon a line equation with a positive slope. A first one of the groups may comprise channel bandwidths below 50 MHz. A second one of the groups may comprise channel bandwidths equal to or above 50 MHz.

In accordance with another example embodiment, an example may comprise a non-transitory computer readable medium comprising program instructions that, when executed with an apparatus, cause the apparatus to perform at least the following: determining which channel bandwidth group, from at least two channel bandwidth groups, the channel bandwidth is associated with; and selecting the equation, from a plurality of equations, based upon the determined channel bandwidth group.

In accordance with another example embodiment, an example apparatus may be provided comprising: means for determining which channel bandwidth group, from at least two channel bandwidth groups, the channel bandwidth is associated with; and means for selecting the equation, from a plurality of equations, based upon the determined channel bandwidth group.

In accordance with another example embodiment, an example apparatus may be provided comprising: at least one processor; and at least one memory storing instructions that, when executed with the at least one processor, cause the apparatus to perform: a first testing of performance of the apparatus with a first channel bandwidth within a first channel bandwidth group to test an allowed maximum power reduction, where the first channel bandwidth is the highest channel bandwidth supported by the apparatus within the first channel bandwidth group supported by the apparatus.

The first testing may be, in fact, a third channel bandwidth to be tested beside the lowest and highest channel bandwidth. The highest supported channel bandwidth within the first channel bandwidth group may be picked for testing, and not all channel bandwidths within the first channel bandwidth group need to be tested.

The first channel bandwidth group may comprise the minimum channel bandwidth supported by the apparatus, and the apparatus is configured to further perform: a second testing of performance of the apparatus with a second channel bandwidth within a second channel bandwidth group to test the allowed maximum power reduction, where the second channel bandwidth is the lowest channel bandwidth supported by the apparatus within the second channel bandwidth group. The first channel bandwidth group may comprise channel bandwidths below 50 MHz. The second channel bandwidth group may comprise channel bandwidths above or equal to 50 MHz. The allowed maximum power reduction may comprise a determined value which is rounded upwards. The determined value may be rounded upward to a closest multiple of about 0.5 dB. The instructions, when executed with the at least one processor, may cause the apparatus to perform further testing comprising testing of lowest and highest channel bandwidths supported by the apparatus.

The second testing may actually be the fourth channel bandwidth to be tested, such as if the device supports any channel bandwidth within the second channel bandwidth group. The highest supported channel bandwidth within the second channel bandwidth group may be picked for testing, and not all channel bandwidths within the second channel bandwidth group need to be tested.

Figure 11:
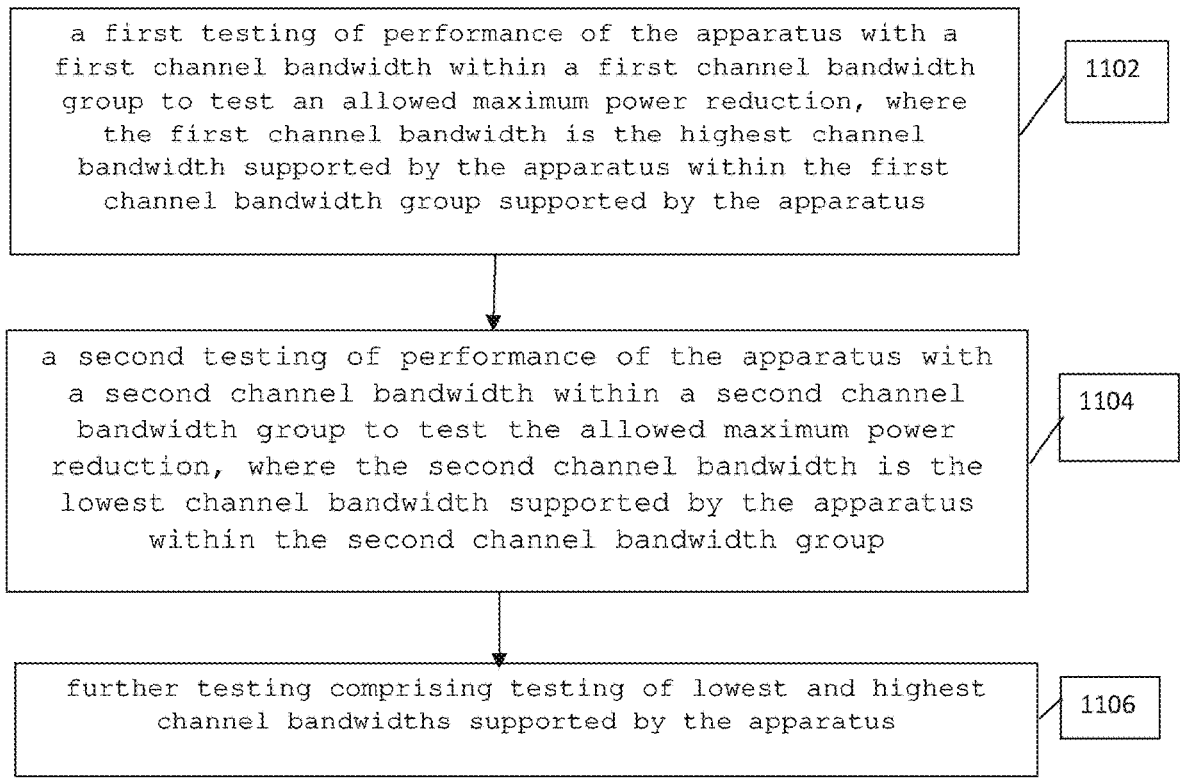
FIG. 11 is a diagram illustrating an example method for an example embodiment.

Referring also to FIG. 11, in accordance with another example embodiment, an example method comprising: a first testing of performance of an apparatus with a first channel bandwidth within a first channel bandwidth group to test an allowed maximum power reduction, where the first channel bandwidth is the highest channel bandwidth supported by the apparatus within the first channel bandwidth group supported by the apparatus as indicated with block 1102.

The method may further comprise: a second testing of performance of the apparatus with a second channel bandwidth within a second channel bandwidth group to test the allowed maximum power reduction, where the second channel bandwidth is the lowest channel bandwidth supported by the apparatus within the second channel bandwidth group as indicated with block 1104. The first channel bandwidth group may comprise channel bandwidths below 50 MHz. The second channel bandwidth group may comprise channel bandwidths above or equal to 50 MHz. The allowed maximum power reduction may comprise a determined value which is rounded upwards. The determined value may be rounded upward to a closest multiple of about 0.5 dB. The method may further comprise testing of lowest and highest channel bandwidths supported by the apparatus as indicated with block 1106.

In accordance with another example embodiment, an example may be provided with a non-transitory computer readable medium comprising program instructions that, when executed with an apparatus, cause the apparatus to perform at least the following: a first testing of performance of an apparatus with a first channel bandwidth within a first channel bandwidth group to test an allowed maximum power reduction, where the first channel bandwidth is the highest channel bandwidth supported by the apparatus within the first channel bandwidth group supported by the apparatus. The instructions, when executed with an apparatus, may cause the apparatus to perform at least the following: a second testing of performance of the apparatus with a second channel bandwidth within a second channel bandwidth group to test the allowed maximum power reduction, where the second channel bandwidth is the lowest channel bandwidth supported by the apparatus within the second channel bandwidth group. The instructions, when executed with an apparatus, may cause the apparatus to perform at least the following: further testing of lowest and highest channel bandwidths supported by the apparatus.

In accordance with another example embodiment, an example apparatus may be provided comprising: means for performing a first testing of performance of an apparatus with a first channel bandwidth within a first channel bandwidth group to test an allowed maximum power reduction, where the first channel bandwidth is the highest channel bandwidth supported by the apparatus within the first channel bandwidth group supported by the apparatus. The apparatus may further comprise means for performing a second testing of performance of the apparatus with a second channel bandwidth within a second channel bandwidth group to test the allowed maximum power reduction, where the second channel bandwidth is the lowest channel bandwidth supported by the apparatus within the second channel bandwidth group. The apparatus may further comprise means for performing further testing of lowest and highest channel bandwidths supported by the apparatus.

In accordance with another example embodiment, an example apparatus may be provided comprising: at least one processor; and at least one memory storing instructions that, when executed with the at least one processor, cause the apparatus to: determine a channel bandwidth; and based upon the determined channel bandwidth, determine a maximum power reduction for the channel bandwidth using a value of the channel bandwidth as a value in an equation. In regard to the "value of the channel bandwidth" being "a value in the equation", the "value in the equation" may be, for example, "CBW" in the first equation noted above. The "value of the channel bandwidth" may be one of the channel bandwidth values, such as in MHz for example, such as on the X-axis in FIG. 5 for example. For example, the "value of the channel bandwidth" for the "value in the equation" may be something such as 10 MHz, 20 MHz, 30 MHz, etc.

In accordance with another example embodiment, an example apparatus may be provided comprising: at least one processor; and at least one memory storing instructions that, when executed with the at least one processor, cause the apparatus to perform: a first testing of lowest and highest channel bandwidths supported by the apparatus; and a second testing of performance of the apparatus within a first channel bandwidth group to test an allowed maximum power reduction, where the first channel bandwidth group comprises either a minimum channel bandwidth supported by the apparatus or a maximum channel bandwidth supported by the apparatus.

As can be seen from the above description, current proposals in standardization will cause a greater maximum power reduction than necessary around resource blocks that are located on the edge of the channel bandwidth. So, with features as described herein equations or algorithms may be used that provide for a more graceful reduction.

Features as described herein may be used with 5G/NR and may look at the maximum power reduction (MPR) allowed for UEs; such as when UL RB (resource block) allocations are at or close to the UL channel bandwidth edges. A UE may be allowed to reduce the maximum output power due to higher order modulations and transmit bandwidth configurations. Edge RB allocations are defined as RB allocations that are located at (or close to) either channel edge, with the allocation size not exceeding a specified maximum value. The Edge RB allocation and the corresponding allowed MPR values may be defined for <50 MHz channel bandwidth and for ≥50 MHz channel bandwidth. However, if the proposal discussed at RAN4 #104-bis-e is accepted, due to the channel bandwidth variation within each frequency group, a 2 dB UL coverage loss will be present; an excessively large value of MRP would be applied. In order to provide that the MPR applied is not excessively more than what is required, the channel bandwidth may be separated into two or more groups (such as <50 MHz and ≥50 MHz for example), and then the allowed MPR values may be defined within each group based on respective equations.

In addition, for testing the UE performance within each group (such as <50 MHz and ≥50 MHz for example), the allowed MPR may also be tested for the maximum channel bandwidth <50 MHz and the minimum channel bandwidth ≥50 MHz that are supported by the UE. This may be in addition to testing for the currently required lowest and highest channel bandwidths supported by the UE. This may be used, therefore, to ensure that the UE can provide sufficient performance within all supported channel bandwidths within the two channel bandwidth groups.

The term "non-transitory," as used herein, is a limitation of the medium itself (i.e., tangible, not a signal) as opposed to a limitation on data storage persistency (e.g., RAM vs. ROM).

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (iii) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The invention claimed is:

1. An apparatus comprising:
at least one processor; and
at least one memory storing instructions that, when executed with the at least one processor, cause the apparatus to:
determine a channel bandwidth (CBW); and
based upon the determined CBW, determine a maximum power reduction (MPR) for the CBW in accordance with an allowed MPR as defined by an equation, wherein the equation is:

$$MPR = CEIL\left(7.2 \text{ dB} - 6 \text{ dB} \cdot \frac{CBW}{100 \text{ MHz}}, 0.5 \text{ dB}\right)$$

in an instance in which the determined CBW is in a group of less than 50 MHz CBWs;
wherein the equation is:

$$MPR = CEIL\left(5.35 \text{ dB} + 3.15 \text{ dB} \cdot \frac{CBW}{100 \text{ MHz}}, 0.5 \text{ dB}\right)$$

in an instance in which the determined CBW is in a group of equal to or larger than 50 MHz CBWs; and
where CEIL(x,0.5 dB) means rounding x upwards to a closest multiple of 0.5 dB.

2. The apparatus as claimed in claim 1 where the equation is determined from at least two respective values of power backoff for CBWs.

3. The apparatus as claimed in claim 2 where the equation comprises a line equation which is determined based upon at least two highest backoff values of at least two spaced respective CBWs in a same CBW group.

4. The apparatus as claimed in claim 2, wherein the apparatus further caused to:
determine with which CBW group, from at least two CBW groups, the channel bandwidth is associated; and
select the equation, from a plurality of equations, based upon the determined CBW group.

5. A method comprising:
determining a channel bandwidth (CBW); and
based upon the determined CBW, determining a maximum power reduction (an MPR) for the CBW in accordance with an allowed MPR as defined by an equation, wherein the equation is:

$$MPR = CEIL\left(7.2\ dB - 6\ dB \cdot \frac{CBW}{100\ MHz}, 0.5\ dB\right)$$

in an instance in which the determined CBW is in a group of less than 50 MHz CBWs;
wherein the equation is:

$$MPR = CEIL\left(5.35\ dB + 3.15\ dB \cdot \frac{CBW}{100\ MHz}, 0.5\ dB\right)$$

in an instance in which the determined CBW is in a group of equal to or larger than 50 MHz CBWs; and
where CEIL(x,0.5 dB) means rounding x upwards to a closest multiple of 0.5 dB.

6. The method as claimed in claim 5 where the equation is determined from at least two respective values of power backoff for CBWs.

7. The method as claimed in claim 6 where the equation comprises a line equation which is determined based upon at least two highest backoff values of at least two spaced respective CBWs in a same CBW group.

8. The method as claimed in claim 6 further comprising:
determining with which CBW group, from at least two CBW groups, the channel bandwidth is associated; and
selecting the equation, from a plurality of equations, based upon the determined CBW group.

9. A non-transitory computer readable medium comprising program instructions that, when executed with an apparatus, cause the apparatus to perform at least the following:
determining a channel bandwidth (CBW); and
based upon the determined CBW, determining a maximum power reduction (MPR) for the CBW in accordance with an allowed MPR as defined by an equation, wherein the equation is:

$$MPR = CEIL\left(7.2\ dB - 6\ dB \cdot \frac{CBW}{100\ MHz}, 0.5\ dB\right)$$

in an instance in which the determined CBW is in a group of less than 50 MHz CBWs;
wherein the equation is:

$$MPR = CEIL\left(5.35\ dB + 3.15\ dB \cdot \frac{CBW}{100\ MHz}, 0.5\ dB\right)$$

in an instance in which the determined CBW is in a group of equal to or larger than 50 MHz CBWs; and
where CEIL(x,0.5 dB) means rounding x upwards to a closest multiple of 0.5 dB.

* * * * *